United States Patent
Kopp (10) Patent No.: US 9,377,209 B2
(45) Date of Patent: Jun. 28, 2016

(54) SYSTEMS AND METHODS FOR CONTROLLING THE TEMPERATURE OF A ROOM BASED ON OCCUPANCY

(75) Inventor: Phillip M. Kopp, San Diego, CA (US)

(73) Assignee: SOMFY SYSTEMS, INC., Dayton, NJ (US)

( * ) Notice: Subject to any disclaimer, the term of this patent is extended or adjusted under 35 U.S.C. 154(b) by 997 days.

(21) Appl. No.: 13/567,942

(22) Filed: Aug. 6, 2012

(65) Prior Publication Data

US 2012/0318490 A1    Dec. 20, 2012

Related U.S. Application Data

(63) Continuation of application No. 12/900,409, filed on Oct. 7, 2010, now abandoned.

(51) Int. Cl.
*G05D 23/19* (2006.01)
*F24F 11/00* (2006.01)
*G05D 23/00* (2006.01)

(52) U.S. Cl.
CPC ............ *F24F 11/0009* (2013.01); *G05D 23/00* (2013.01); *F24F 11/0034* (2013.01); *F24F 2011/0056* (2013.01); *F24F 2011/0064* (2013.01)

(58) Field of Classification Search
CPC ............... F24F 11/0009; F24F 2011/0056; F24F 11/0034; F24F 2011/0064; G05D 23/00
See application file for complete search history.

(56) References Cited

U.S. PATENT DOCUMENTS

| | | | | | |
|---|---|---|---|---|---|
| 5,476,221 | A | * | 12/1995 | Seymour | F24F 11/0034 236/47 |
| 5,986,357 | A | * | 11/1999 | Myron | G06K 9/00335 307/116 |
| 6,260,765 | B1 | * | 7/2001 | Natale | G05D 23/1905 236/47 |
| 7,154,399 | B2 | * | 12/2006 | Cuddihy | G08B 21/028 340/506 |
| 7,918,406 | B2 | * | 4/2011 | Rosen | F24F 11/0012 165/237 |
| 2002/0047775 | A1 | * | 4/2002 | del Castillo | H04L 12/2803 340/3.54 |
| 2006/0186214 | A1 | * | 8/2006 | Simon | F24F 11/0012 236/1 C |
| 2008/0179053 | A1 | * | 7/2008 | Kates | F24F 3/044 165/208 |
| 2011/0270446 | A1 | * | 11/2011 | Scharf | F24F 11/0001 700/282 |

FOREIGN PATENT DOCUMENTS

KR    10-2006-0089994 A    8/2006

\* cited by examiner

*Primary Examiner* — Ramesh Patel
(74) *Attorney, Agent, or Firm* — Procopio Cory Hargreaves & Savitch LLP; Noel C. Gillespie (57) ABSTRACT

An environment control system for controlling the temperature in a room, the system comprises a heating and cooling system; a thermostat for monitoring the temperature within a room and controlling the heating and cooling system; a motion sensor for detecting whether a door or window to the room has been opened; a presence detector for detecting whether the room is currently occupied; and a control system in communication with the thermostat, the motion sensor, and the presence detector, the control system being configured to control the room's temperature via the thermostat based at least in part on signals received from the thermostat, the motion detector and the presence detector.

17 Claims, 5 Drawing Sheets

SYSTEMS AND METHODS FOR CONTROLLING THE TEMPERATURE OF A ROOM BASED ON OCCUPANCY

RELATED APPLICATIONS

This application is a continuation of U.S. patent application Ser. No. 12/900,409 filed Oct. 7, 2010, the content of which is incorporated herein by reference in its entirety.

BACKGROUND

1. Technical Field

The embodiments described herein are related to automated environment control system operation and more particularly, to systems and methods for controlling the temperature of the room based on occupancy.

2. Related Art

Heating, ventilating, and air conditioning (HVAC) systems provide control over the indoor environment of buildings through heating, cooling, and air circulation. Rising energy costs have driven manufacturers to make an effort to make these systems more energy efficient; however, even the most energy efficient HVAC systems can still waste energy by heating or cooling unoccupied spaces within a building. For example, hotels can have numerous unoccupied guest rooms. Heating and cooling these unoccupied rooms is not only a waste of energy, but also of money. Heating and cooling unoccupied areas of hotel can significantly increase the hotel's utility bills. Heating and cooling of unoccupied areas of residential properties can also have a significant impact on utility bills. For example, in a multi-story home, occupants may be downstairs during the day and move upstairs at night. Accordingly, it can be inefficient and costly to heat or cool the upstairs during the day and the downstairs at night.

Office buildings provide another example of a type of building that can have widely variable occupancy rates where the HVAC system can waste significant amounts of energy heating and cooling unoccupied portions of the building. During the day, many offices are likely to be occupied, while on weekends or during evenings, much of the building is likely to be vacant. Often building owners or managers will simply turn off the HVAC services to the building during low occupancy periods; however, this leaves anyone occupying the building during these periods without HVAC services, which can result in a stuffy and/or uncomfortably hot or cold working environment. Furthermore, this all or nothing approach does not take into account portions of the building that can remain unoccupied even during the peak occupancy hours (e.g., vacant offices). Conventional HVAC systems do not provide the ability to limit HVAC services to occupied portions of the building.

Some manufactures have attempted to balance the needs of energy efficiency with comfort of occupants of a building by providing systems that can cycle HVAC systems on and off in order to maintain temperatures of unoccupied portions of the building within a certain predefined range. However, these conventional approaches must sacrifice either energy efficiency or occupant comfort. For example, some conventional HVAC systems, particularly in hotels and resorts, sacrifice energy efficiency in order to maintain the temperatures of unoccupied rooms within a very narrow temperature range in order to ensure that if an occupant enters a previously unoccupied portion of the building, the temperatures are still within a comfortable range. Such a system is often used in hotel rooms to attempt to conserve energy by limiting the heating or cooling of the room while the room is unoccupied. But the HVAC system is configured to maintain the temperatures within a narrow range so that should a hotel guest return to his or her room, the room will still be at a relatively comfortable temperature. To maintain the temperatures within this narrow temperature range requires that the HVAC system still run relatively frequently, sacrificing energy savings.

Other conventional HVAC systems sacrifice occupant comfort in exchange for increased energy savings. For example, the HVAC system can be configured to shut off entirely when the room is unoccupied. While this approach can result in significant energy savings by limiting or stopping HVAC services to unoccupied rooms, the temperatures of the room can become extremely uncomfortable for occupants entering the previously unoccupied room. Furthermore, occupants returning to a room that is too hot may adjust the HVAC system to a much lower setpoint in order to more quickly bring the temperature of the room down to a comfortable range, which can sacrifice much of the energy savings provided by shutting down the HVAC system while the room was unoccupied.

Another problem with conventional techniques for reducing the energy consumption of a HVAC system is the inability of such systems to accurately determine whether a particular room or area is occupied. Conventional techniques will often begin regulating the HVAC operation for energy savings when the system determines that a room or area is unoccupied. Accordingly, it is important to be able to accurately detect occupancy.

SUMMARY

Systems and methods for controlling the temperature of a room using an environment control system are described herein. Improved techniques for determination of room occupancy status are provided. The environment control system can be configured to operate in an energy saving mode while the room in unoccupied. The energy saving mode can reduce energy consumption by controlling the run time of a heating and cooling system, e.g., a HVAC system based on both temperature and by controlling the duty run-time of the system.

In one aspect, an environment control system for controlling the temperature in a room comprises a temperature sensor for monitoring the temperature within a room; at least one occupancy sensor for determining whether the room is occupied; a heating and cooling system; a control system in communication with the temperature sensor, the at least one occupancy sensor, and the heating and cooling system, the control system being configured to control the room's temperature via the heating and cooling system based at least in part on signals received from the temperature sensors and the at least one occupancy sensor, the control system being configured to operate the heating and cooling system in a power savings mode when the room is unoccupied based on a series of time cycles during which the heating and cooling system is turned on or off as dictated by a plurality of temperature thresholds.

In another aspect, an environment control system for controlling the temperature in a room comprises a heating and cooling system; a thermostat for monitoring the temperature within a room and controlling the heating and cooling system; an activity sensor for detecting whether a door or window to the room has been opened; a presence detector for detecting whether the room is currently occupied; and a control system in communication with the thermostat, the activity sensor, and the presence detector, the control system being configured to control the room's temperature via the thermostat based at least in part on signals received from the thermostat, the activity detector and the presence detector, the control system being configured to cause the heating and cooling system to operate in a power savings mode when the room is unoccupied based on a series of time cycles during which the heating and cooling system is turned on or off as dictated by a plurality of temperature thresholds.

In still another aspect, a method for operating an environment control system comprises monitoring at least one activity detector for detecting whether a door or window to a room has been opened; monitoring at least one presence detector for detecting whether the room is occupied; monitoring a temperature sensor to determine the room's temperature; and operating a heating and cooling system of the room to in a power saving mode when the room is unoccupied based on a series of time cycles during which the heating and cooling system is turned on or off as dictated by a plurality of temperature thresholds.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

The following detailed description is directed to certain specific embodiments. However, it will be understood that these embodiments are by way of example only and should not be seen as limiting the systems and methods described herein to the specific embodiments, architectures, etc. In this description, reference is made to the drawings wherein like parts are designated with like numerals throughout.

The systems and methods disclosed herein provide an environment control system that can conserve power by operating the HVAC system of a room in a power conserving mode when the room is unoccupied. Unlike conventional systems or techniques, the temperature of the room can be maintained near a desired setpoint and within an absolute temperature range while still providing significant energy savings by reducing the amount of time that the environmental system must run the HVAC system. If someone enters an unoccupied room, the temperature will be within a comfortable range, unlike many conventional systems where the temperature of the room can rise to an uncomfortable level, which can cause the user to set the system to an even lower setpoint in an attempt to more quickly cool the room to a comfortable temperature.

Additionally, the embodiments disclosed herein use data collected from a combination of entry door activity sensors and occupancy sensors to more accurately determine the occupancy status of the room. The sensors can be implemented as either wireless or wired sensors.

When the environment control system detects that the room is unoccupied, the environment control system can operate in an energy savings mode that conserve energy while maintaining the temperature of the room within a comfortable temperature range. The systems and methods disclosed herein can use a control algorithm that is not based solely on a fixed setback temperature like many conventional environment control systems in order to more efficiently operate the HVAC system of the room while the room is unoccupied.

The control algorithm disclosed herein reduces energy consumption by controlling the run time of the HVAC system based on both temperature and by controlling the duty runtime of the system. This ensures that the air conditioning system of the room will not run for excessively long or short periods of time, while also ensuring a more comfortable relative temperature in the room.

Figure 1:
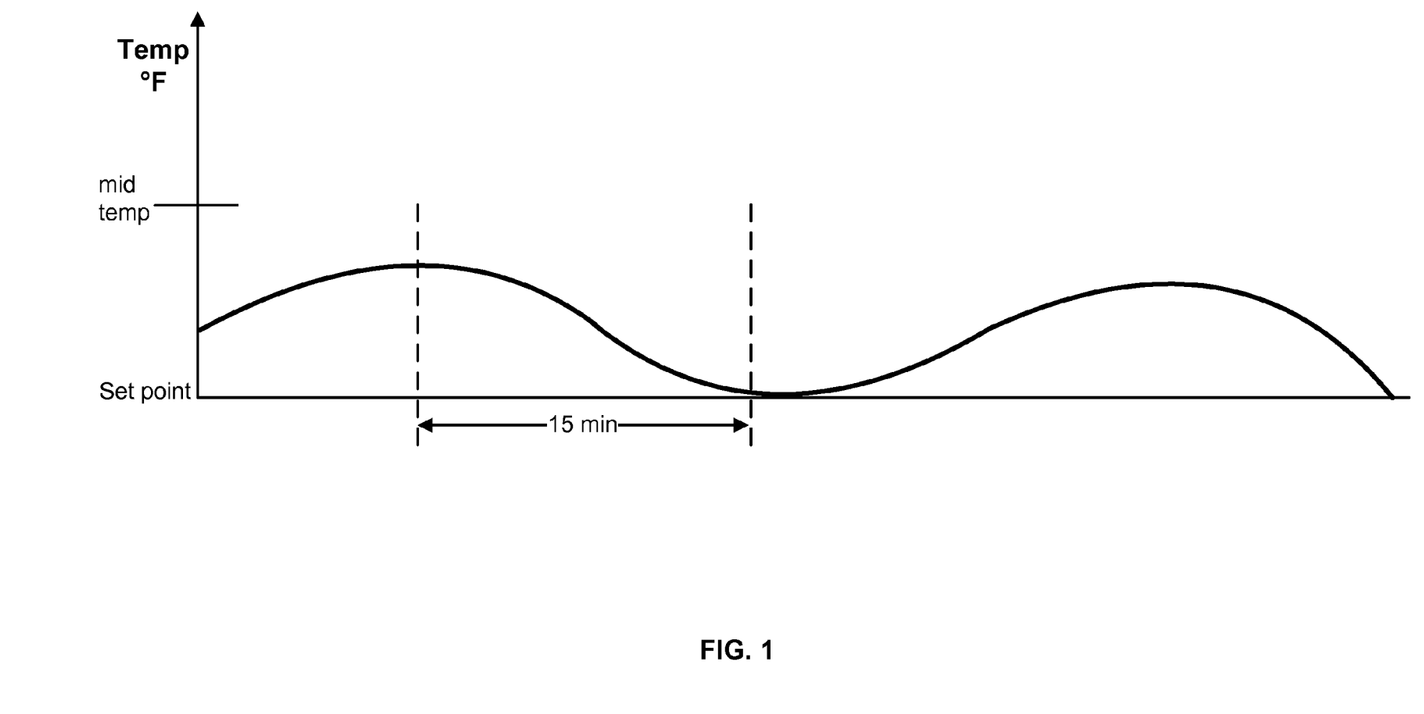
FIG. 1 is a plot of the temperatures in a room over time using a conventional environment control system to maintain the temperature of the room.

FIG. 1 illustrates a plot of temperature of a room in degrees Fahrenheit over time for a conventional environment control system that is configured to operate the HVAC system based solely on the temperature of the room. The environment control system is configured to maintain the temperature in the room between a set point and a max temperature when the system detects that the room is unoccupied. When the system detects that the room is unoccupied, the system will stop the HVAC from operating. Over time, the temperature in the room rises to the max temperature, which triggers the control system to allow the HVAC system to run to cool the room until the temperature of the room reaches the set point. The HVAC system switches off when it reaches the set point and the temperature of the room once again rises. Once the temperature reaches the max temperature again, the HVAC system switches on again and runs until the temperature in the room reaches the set point. Often, the max temperature is chosen such that it takes a certain amount of time to reach the set point again. For example, the max temperature can be selected such that it takes approximately 15 minutes to reach the set point once the max temperature has been reached and the HVAC has been turned back on; however, in practice it is difficult to estimate how long it actually will take to drive the temperature back to the set point.

Consequently, the process illustrated in FIG. 1 can be inefficient and ineffective. For example, in order to achieve significant energy savings, the max temperature must be set well enough above the set point such that it is likely the temperature will be several degrees higher than the set point when the occupant re-enters. Not only will this cause discomfort for the occupant, but the occupant is likely to then lower the set point causing the HVAC to then work even harder and waste more energy. To avoid this, the max temperature can be set lower; however, this will not achieve much in the way of energy savings.

Figure 2:
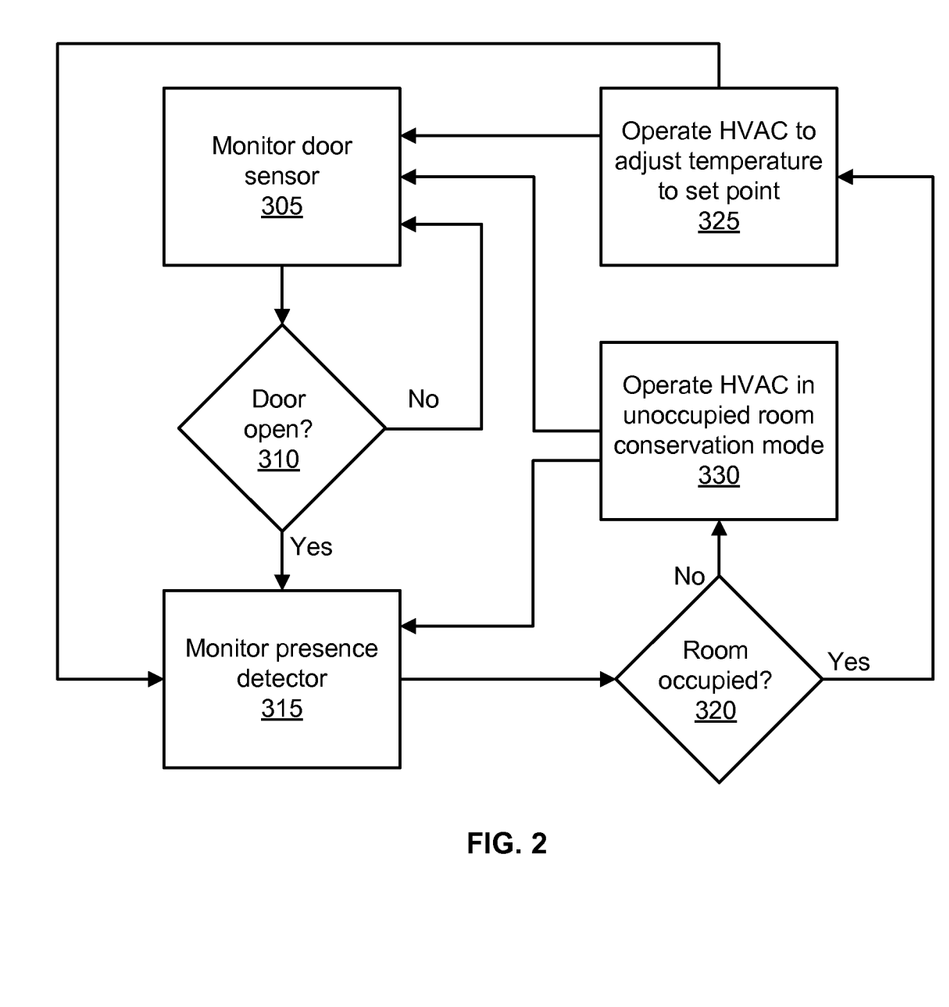
FIG. 2 is a flow chart illustrating an example process for operating an environment control system, such as that illustrated in FIG. 5, in accordance with an embodiment.

FIG. 2 is a flow chart illustrating an example process for operating an environment control system for maintaining the temperature of an unoccupied room while also conserving energy by reducing the overall time that the HVAC system is operated in accordance with one or embodiment. A control system of the environment control system monitors one or more doors to determine whether the room is occupied (step 305). For example, a room might include multiple doors, such as an entry door and a set of French doors that open onto a balcony or other area outside of the room. A determination is made based on the signal data received from the door and/or window sensors whether a door or window to the room has been opened (step 310). These types of sensors can collectively be referred to as activity sensors.

If a door has been opened, signals from a presence detector are monitored (step 315) to determine whether someone is in the room. According to an embodiment, a presence sensor can be strategically positioned for sensing whether a person is present in the room. In an embodiment, the presence detector can be integrated into a housing that mimics the appearance of a smoke detector. In an alternative embodiment, the presence detector can be integrated into the housing of an active smoke detector. The ability to hide the presence detector or cause it to blend in can be important in e.g., a high end resort or a home, where guests or residents do not want various sensors and electronics to interfere with the décor. Use of e.g., a smoke detector or faux smoke detector housing also allows the presence detector to be positioned where the ability to detect the presence of the occupant is maximized. This is important since accurate occupancy detection plays an important role in the process.

According to an embodiment, the presence detector can be implemented as a passive infrared (PIR) motion sensor.

A determination whether the room is occupied is made based on data received from the presence detector (step 320). For example, once activity sensor indicates that the status of the window or door has changed, the presence detector can begin searching to determine whether the room is occupied, e.g., for a fixed period of time. According to some embodiments, a presence detector can be used to detect the presence of an occupant or occupants in a room without the use of an activity sensor by placing the presence detector in a location that can maximize the likelihood that the sensor will be able to detect the presence of the occupant or occupants. In some embodiments, multiple presence detectors can be used to determine whether a room is occupied. As described above, the presence detectors can be integrated into a housing that mimics the appearance of a smoke detector. In an alternative embodiment, the presence detector can be integrated into the housing of an active smoke detector.

If the room is occupied, then the HVAC system is operated to maintain the temperature at or near the set point (step 325). Otherwise, if the room is unoccupied, the HVAC system is operated in a power conserving mode (step 330). The control system continues to monitor the activity sensor(s) to determine whether a door to the room has been opened (step 305), which can indicate that an occupant has entered the room. The control system also continues to monitor the presence detector to determine whether the room is occupied (step 315). The presence detector can be monitored independently and in parallel with the activity sensor(s) to handle situations where a room can have more than one occupant. If an occupant leaves the room while another occupant remains in the room, the presence detector can sense the presence of the other occupant in the room without requiring that the door first be opened.

Figure 3:
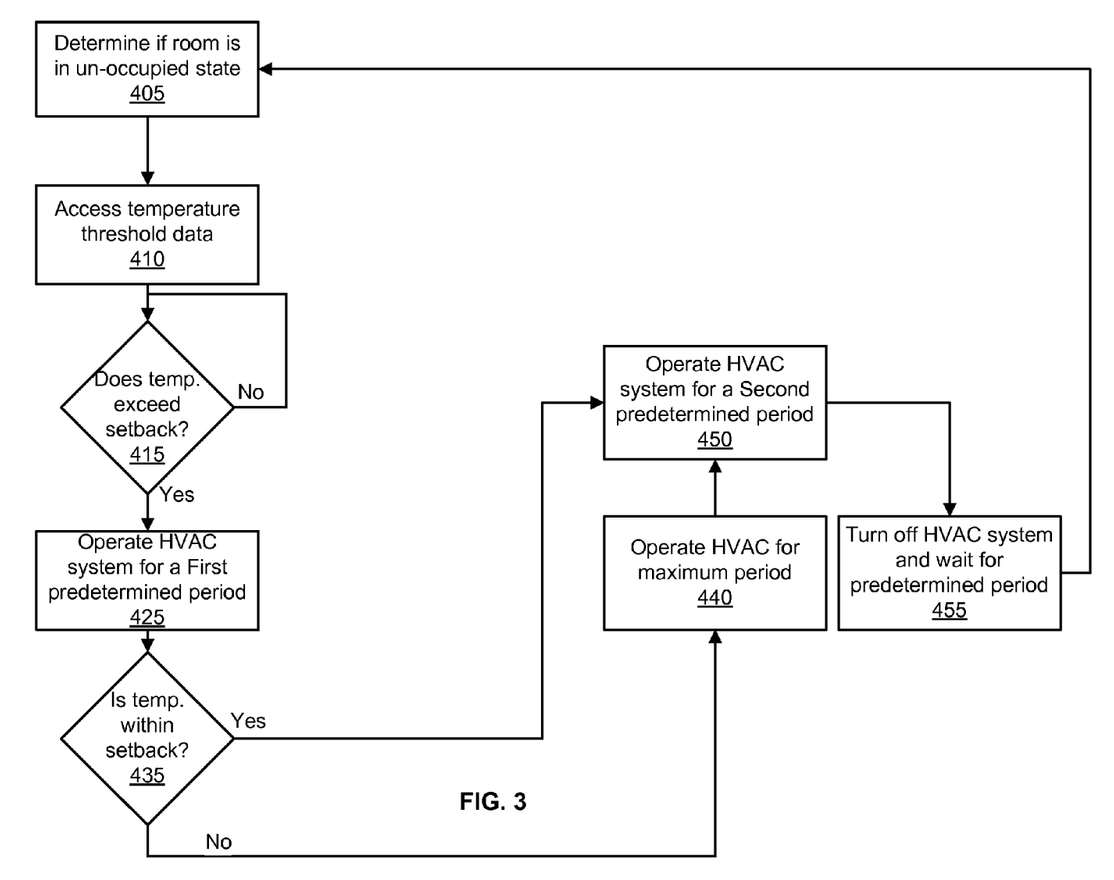
FIG. 3 is a flow chart illustrating an example process for operating an environment control system in a power saving mode according to one embodiment.

FIG. 3 illustrates a method for operating an environment control system while a room is unoccupied in order to maintain the temperature of the room within a comfortable range and to conserve power in accordance with one embodiment. The method illustrated in FIG. 3 can, e.g., be used to implement step 330 of FIG. 2. In this example, the room is being cooled when occupied. When the environment control system determines that the room is unoccupied, the control system can be configured to operate in a power conserving mode. The power conserving mode uses temperatures as well as predetermined run or operating times for determining how long the HVAC system of the room can operate.

According to an embodiment, the method illustrated in FIG. 3 should result in a temperature vs. time plot that is similar to that illustrated below in FIG. 4. Often, when implementing the process of FIG. 2, the HVAC system is only operating e.g., approximately 30% of the time, while the remaining e.g., 70% of the time the air conditioner is shut down to conserve power.

First, the environment control system can then determine that the room is in the un-occupied mode (step 330:405). If so, then the system can switch to the power conserving mode. The control system can be configured to access setback threshold data (step 410) when the environment control system switches to the power conserving mode. According to an embodiment, the setback threshold data can include a maximum and minimum temperature for the room such as that illustrated in Table 1. The environment control system can be configured to operate the HVAC system to cool the room if the temperature of the room reaches or exceeds the maximum setback threshold, or to heat the room if it reaches or exceeds the minimum setback threshold. The maximum and minimum setback threshold data can be programmed into a control system in the room or can be programmed into a central control computer system used to control the operation of the environment control system throughout a building.

In step 415, the system can then determine whether the temperature in the room is under the maximum setback threshold, or simply setback threshold. When it is determined in step 415 that the temperature is below the setback threshold, then the system can continue to check whether the temperature is below the setback threshold.

If the temperature is not under the setback threshold, e.g., the setback threshold has been met or exceeded, then the system can be configured operate the HVAC system to, e.g., cool the room for a first predetermined period of time (step 425). The environment control system is configured to operate the HVAC system for the predetermined time period in order to drive the temperature of the room toward the set point (550 in FIG. 4). In certain embodiments, the length of the first predetermined time period for operating the HVAC system can be programmed into the environment control system by an administrator. In other embodiments, the length of the first predetermined time period can be configured using the central control computer system, or can be set at the factory. In yet other embodiments, the length of the first predetermined time period can be calculated based on the maximum temperature threshold or setback point, the set point temperature, the size of the room, other factors that can affect the cooling of the room, or a combination thereof.

After operating the HVAC system of the room for the first predetermined period of time, a determination is made whether the temperature of the room is moving toward the set point, e.g., by determining whether the temperature is now within the setback threshold (step 435). If the temperature of the room is not within the setback threshold, then the control system is configured to continue to run the HVAC for up to a maximum time period (step 440). For example, the maximum time period can be approximately 60 minutes.

Once the HVAC has run for the maximum time period in step 440, or if it is determined that the temperature is below the setback threshold in step 435, then the HVAC can be run for an additional second predetermined period of time (step 450). The environment control system is configured to operate the HVAC system for the second predetermined time period in order to continue driving the temperature of the room down toward the set point 550 or below. The second predetermined period of time can be of the same or different length as the first predetermined period of time. For example, in one embodiment the first predetermined time period is approximately 16 minutes, while the second predetermined time period is approximately 10 minutes.

According to an embodiment, the length of the second predetermined time period for operating the HVAC system can be programmed into the environment control system by an administrator, and in some embodiments, the length of the second predetermined time period can be configured using the central control computer system, or can be set at the factory. In yet other embodiments, the length of the second predetermined time period can be calculated based on the current temperature of the room at step 435, the set point temperature, the size of the room, other factors that can affect the cooling of the room, or a combination thereof.

Following completion of the second time period (step 450), then the HVAC can be turned off in step 455 and the process can repeat at step 405. The HVAC can be turned off for a predetermined period of time, e.g., 20 minutes. In other embodiments, the HVAC can remain off, until the system detects that the setback temperature has been reached or exceeded. In still other embodiments, the time period for which the HVAC can be turned off can be adjustable to allow for further energy savings.

As noted, the lengths of the first and second predetermined time periods can be the same or can be different. Further, the combined time periods can be configured to ensure that, e.g., a maximum of a 50% duty cycle is achieved, such that the HVAC will never operate for more than half the time when the room is unoccupied. By controlling the HVAC in this manner, significant power savings can be achieved. For example, despite that fact that a roughly 50% duty cycle is depicted in FIG. 4, the total operational period for the HVAC often represents approximately 30% of the total length of time included in the cycle. Therefore, the environment control system is often only operating the HVAC system approximately 30% of the time that the room remains unoccupied. This can result in significant energy savings while maintaining the temperature in the room within, e.g., approximately 2 degrees of the setpoint for a significant portion of the overall time. Therefore, when a person does enter the room, the temperature of the room will be within a comfortable range relative to the setpoint and the amount of energy required to bring the temperature of the room to the setpoint is minimized.

Figure 4:
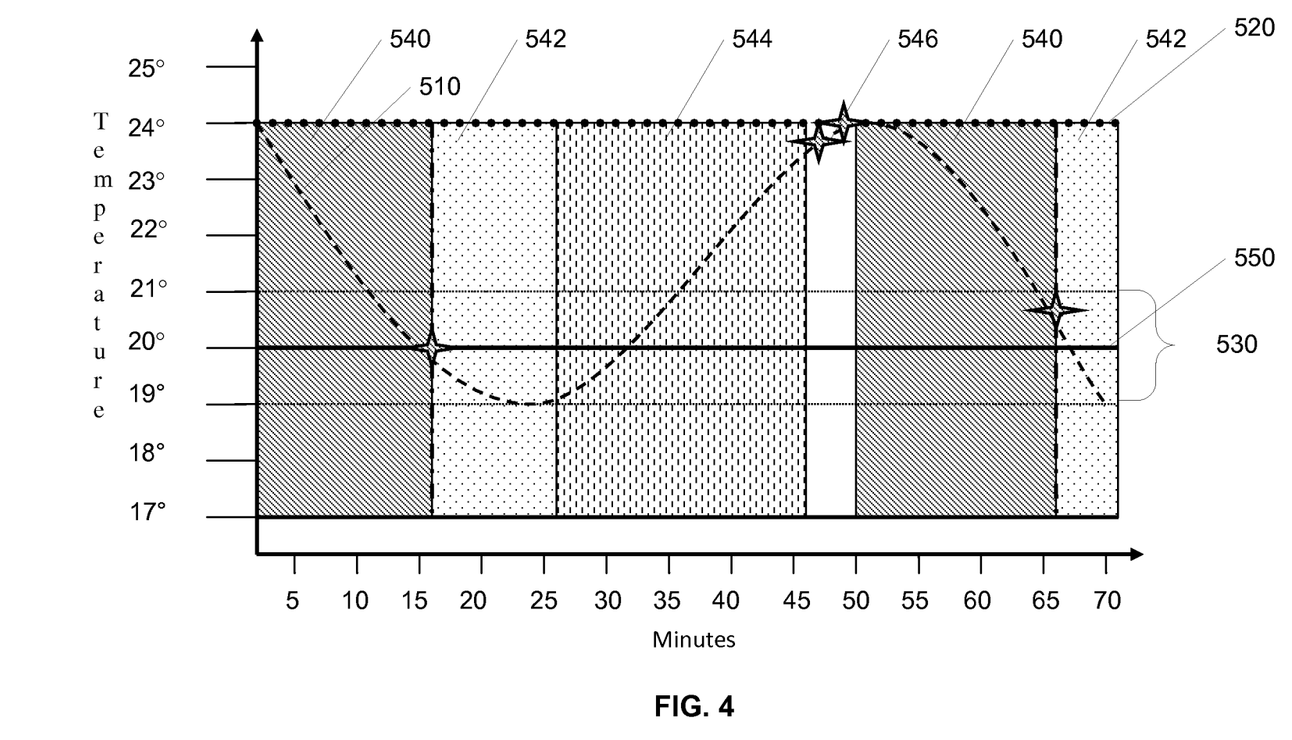
FIG. 4 is an example graph of the temperature versus time when implementing the process of FIG. 3.

FIG. 4 is an example graph of the temperature versus time when implementing the process of FIG. 3. The graph illustrates the current temperature 510 in relation to the set back threshold 520, thermostat dead band 530, and set point temperature 550. In this example, the HVAC is operating to cool the room and has been off, e.g., the system is in the unoccupied mode of step 410. Moreover, it has been determined that the temperature has met or exceeded the setback threshold 520, e.g., in step 415. Thus, the HVAC has been turned on is operating for a first predetermined time period as indicated by region 540 (step 425).

As noted above, the system then checks the temperature to determine if is within the setback threshold 520 (step 435). In this example, the temperature is within the setback threshold as illustrated by the star in FIG. 4. Thus, the system operates the HVAC for a second predetermined time period as indicated by region 542 (step 450). Also as noted above, if the temperature is not within the setback threshold when checked at step 435, then the HVAC can be operated for a maximum time period (step 440) (not shown in FIG. 4) before the HVAC is operated for the second predetermined time period (step 450).

At the end of the second predetermined time period, the HVAC is turned off for a predetermined off time period as illustrated by region 544 (step 455). The system can then determine whether the temperature has met or exceeded the setback threshold, and maintain the off status for the HVAC until the setback threshold is met or exceeded at which point a new cycle can begin.

It should be noted that when the HVAC is turned off, the temperature can drop when the HVAC was heating the room. Thus a minimum setback threshold can be set and used in a similar manner as the maximum setback threshold. Thus, the environment control system can be configured to operate according to maximum and minimum setback thresholds when in an energy conservation mode. Further, these thresholds can be made wider relative to the setpoint because of the control process and superior occupancy determination relative to conventional systems.

Thus, as can be seen an as has been explained, a plurality of time thresholds and temperature thresholds are used to control the temperature of an unoccupied room in accordance with the systems and methods described herein. In other words, unlike a conventional system that only used a setback point and an operational time, e.g., 15 minutes, to control the temperature of an unoccupied room, the systems and methods described herein make use of a plurality of on and off times in addition to the setback point, or even multiple setback points ad described below. For example, the systems and methods described herein can use first and second predetermined operational time periods, the maximum time period, a first off period, and optionally a second time period.

Moreover, unlike conventional systems, in certain embodiments the maximum and minimum setback thresholds can be configurable. For example, a table of high and low temperature threshold pairs can be programmed into the system to allow some configuration of these parameters. For example, in one specific implementation, 4 thresholds pairs can be defined. The following table is present by way of example:

TABLE 1

|    | High   | Low    |
|----|--------|--------|
| T1 | 82° F. | 55° F. |
|    | 28° C. | 14° C. |
| T2 | 77° F. | 59° F. |
|    | 25° C. | 15° C. |
| T3 | 75° F. | 63° F. |
|    | 24° C. | 17° C. |
| T4 | 72° F. | 64° F. |
|    | 22° C. | 18° C. |

It will be understood that more or different threshold pairs can be implemented.

The limit table can then be presented to the user, in certain embodiments, such that the user can select the "T" setting that is most comfortable for them. In another embodiment, multiple tables can be used, e.g., with temperature limits, or thresholds that are progressively higher, lower, wider, or some combination thereof, e.g., depending on how long the room is unoccupied. For example, the temperature thresholds in Table 1 can be used initially to control the temperature when the room us unoccupied. After a certain amount of time, the thresholds in Table 2 can then be used.

TABLE 2

|    | High   | Low    |
|----|--------|--------|
| T1 | 88° F. | 52° F. |
|    | 31° C. | 11° C. |
| T2 | 82° F. | 54° F. |
|    | 28° C. | 12° C. |

TABLE 2-continued

|    | High          | Low           |
|----|---------------|---------------|
| T3 | 79° F. 26° C. | 57° F. 14° C. |
| T4 | 75° F. 24° C. | 59° F. 15° C. |

The process of moving to different setback thresholds can be referred to as "deep setback." For example, the system can widen the setback thresholds after, e.g., 24 hours of unoccupied status or inactivity in the room. This technique provides even greater energy efficiency in rooms that are less utilized or for rooms that remain vacant. In order to avoid a room operating in a deep setback mode from unnecessary reverting to a standard setback mode during routine room cleaning or servicing of the room, the environment control system can be configured to allow a maximum occupied time period during any given 24 hour period while in deep setback mode. Unless this maximum occupied time period has been exceeded, the unit will environment control system continue to operate the HVAC system in the deep setback mode, even if the door monitor or presence detectors have been activated. The environment control system can store in a persistent memory each occupied period so that the maximum allowable time consists of cumulative occupancy periods until the maximum occupied time period is exceeded. For example, in an embodiment, the environment control system can be configured to use a maximum allowable time period of 30 minutes every 24 hour period. If the room is entered for servicing for three 10 minute periods under this configuration, the maximum allowable time of 30 minutes will have been met. The next time the room is occupied the environment control system will revert from deep setback operation back to normal setback operation. If the room only had been occupied for 10 minutes, the environment control system would have remained in a deep setback operation until the room is re-occupied for more than 20 additional minutes. In an embodiment, the environment control system resets the maximum allowable time period data every 24 hours, so that the room must be occupied again for more than the 30 minutes maximum allowable time before controller reverts to standard setback operation.

The threshold table(s) or values can be programmed in the factory or upon installation depending on the embodiment.

Thus, in the systems and methods described herein, the HVAC can be controlled based on occupancy, which can be determined with a high degree of accuracy, according to set of time periods or series of time cycles keyed off of various temperature thresholds. During the control period there can be a minimum on time during which the controller activates the HVAC after a low or high temperature limit is reached. There can also be a minimum off period during which the controller deactivates the HVAC once the minimum run time has been satisfied due to HVAC operation.

Figure 5:
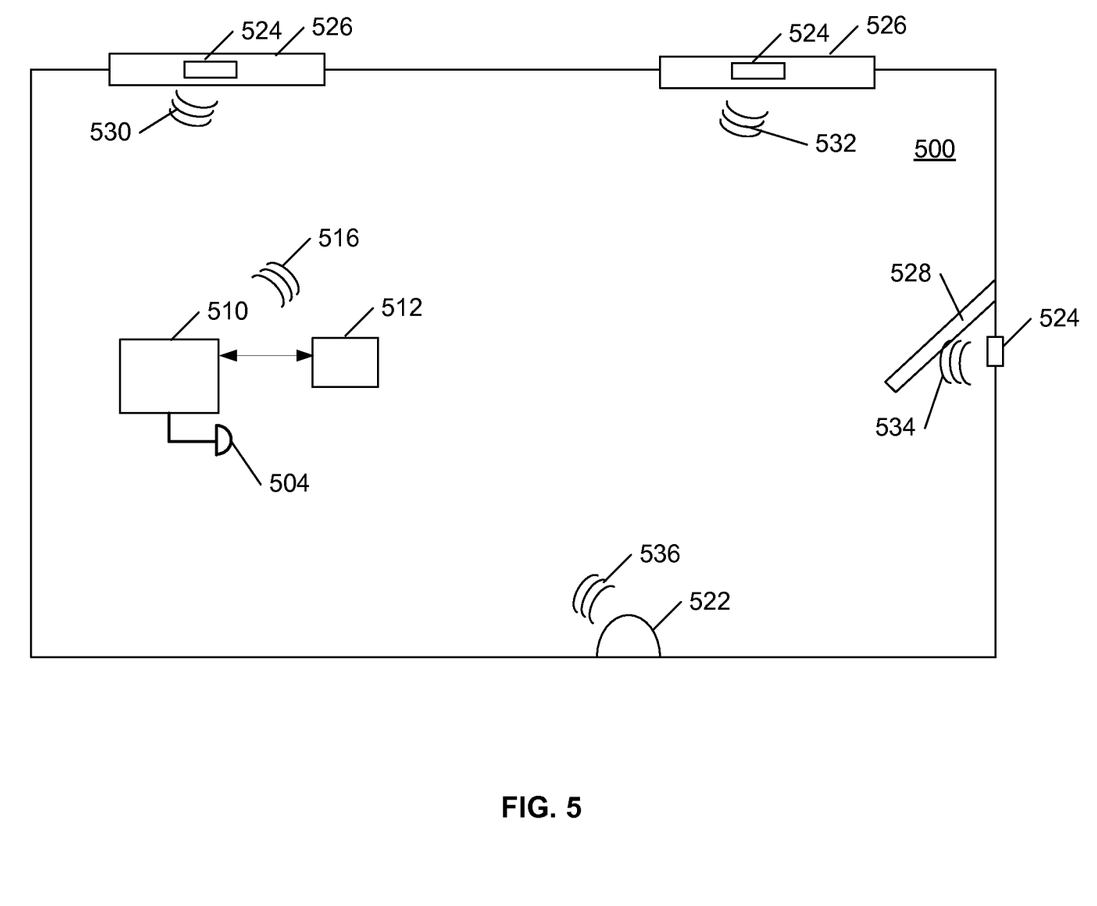
FIG. 5 is a diagram illustrating an example environment control system in accordance with one embodiment.

FIG. 5 is a diagram illustrating an example environment control system that can be used to implement the methods illustrated in FIGS. 3 and 4 in accordance with one embodiment.

System 500 comprises a controller 510, which can include a processor or controller as well as the components, hardware and software; sensors; data storage; etc., needed to control, e.g., lighting, temperature, etc., within the room. Controller 510 can be interfaced wired or wirelessly with a temperature sensor 512, which can provide temperature information to controller 510. In an embodiment, the temperature sensor 512 can comprise a programmable thermostat that is then interfaced with the HVAC system for the room. In addition, system 500 can include a presence detector 522 configured to detect the presence of someone in the room as well as activity sensors 524 interfaced with windows 526 and door 528. Sensors 524 can be configured to detect whether windows 526 or door 528 have been opened or closed.

Activity sensors 524 can be configured to detect the status of windows 526 and door 528, e.g., in order to detect whether someone has entered the room or whether one of the windows or door is open. Presence detector 522 can be configured to detect whether an individual is in the room. As described above, the presence detector 522 can be implemented as a passive infrared (PIR) sensor. In some embodiments, the presence detector 522 can be integrated into a case that mimics the appearance of a smoke detector or other device, appliance, or décor normally found in the room. In yet other embodiments, the presence detector 522 can be integrated into a smoke detector mounted on a wall or the ceiling of the room.

Daylight sensor 504 can be communicatively coupled with controller 510. Any, all, or a combination of a temperature sensor 512, activity sensors 524, daylight sensor 504, and presence detector 522 can be communicatively coupled with controller 510 either via a wired or wireless interface.

In the example of FIG. 5, temperature sensor 512 and daylight sensor 504 are shown as being connected via a wired connection with controller 510, while activity sensor(s) 524 and presence detector 522 are illustrated as being coupled with controller 510 via wireless communication signals 530, 532, 534, and 536. Again, signals 530, 532, 534, and 536 can be optical or radio signals depending on the embodiment.

It can be preferable, as in the examples described so far, for control of the HVAC to reside within the room, e.g., within controller 510. Thus, in the example of FIG. 5, activity sensor(s) 524 can be configured to detect when a door or window is opened, and communicate such to controller 510. This can then cause various steps to occur. As described in FIG. 3, detection that a door or window is opened can then cause presence detector 522 to being searching for an occupant, e.g., for a set period of time. if the motion detector 522 detects an occupant, then controller 510 can allow the HVAC to continue being controlled as it normally would, e.g., by thermostat 512 and based on a setpoint set by the occupant. If presence detector 522 does not detect an occupant within the set time period, then controller 510 can control the HVAC, e.g., via the thermostat 512, according, e.g., to the method described in relation to FIGS. 2-4.

It should be noted that the use of both motion detectors 524 and presence detector 522 allows a much more accurate determination of occupancy than is provided in conventional systems. Thus, the use of both activity sensor(s) 524 and presence detector 522 can improve results even if a conventional set back methodology is used.

In other embodiments, different steps can be taken depending on whether an activation signal is received from a main entrance or a secondary entrance, such as a balcony door, or a window. For example, the process described above can commence if the signal is associated with a main entrance. But if the signal is associated with a secondary entrance or window, then controller 510 can do nothing, i.e., allow thermostat 512 to control the HVAC as before; implement the control process described above, i.e., treat the signal the same as if it was associated with the main entrance; or shut off the HVAC.

In other embodiments, it can be preferable to have a central controller control HVAC operation instead of or in combination with a local controller, such as controller 510. Regardless, however, of whether central or localized control is implemented, the ability to accurately detect occupancy and the use of both temperature and operating time thresholds can produce significant energy savings without compromising occupant comfort.

It should also be noted that multiple presence detectors can be used in conjunction with one or more motion detectors. For example, two or more presence detectors can be used in a multi-room suite or residence.

Daylight sensor 504 can be used to modify the operation of system 500. For example, if the sun is hitting the room for a significant portion of the day, then the room is going to be warmer than average. Daylight sensor 504 can be positioned to detect how much sun is hitting the room. This information can then be used, e.g., by controller 510 to adjust the temperature control algorithm. For example, controller 510 can be configured to automatically select a lower temperature threshold pair from, e.g., Table 1 when daylight sensor detects that the sun is hitting the room for a significant period. Also, as mentioned, the time periods associated, e.g., with the process illustrated in FIGS. 2-4 can be adjusted based on how much sunlight is hitting the room.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. An environment control system for controlling the temperature in a room, the system comprising:
   a temperature sensor for monitoring the temperature within a room;
   at least one occupancy sensor for determining whether the room is occupied;
   a heating and cooling system;
   a control system in communication with the temperature sensor, the at least one occupancy sensor, and the heating and cooling system, the control system being configured to control the room's temperature via the heating and cooling system based at least in part on signals received from the temperature sensors and the at least one occupancy sensor, the control system being configured to operate the heating and cooling system in a power savings mode when the room is unoccupied based on a series of time cycles during which the heating and cooling system is turned on or off as dictated by a plurality of temperature thresholds;
   wherein the control system is configured to shut down the heating and cooling system of the room when the control system detects that the room is currently unoccupied, and to monitor the temperature of the room until the temperature reaches or exceeds a maximum or minimum threshold temperature; and
   wherein the control system is further configured to:
   calculate a first predetermined period of time based on one of the maximum temperature threshold and a set point temperature,
   operate the heating and cooling system of the room for the first predetermined period of time when the temperature of the room reaches or exceeds the maximum or minimum threshold temperature, and
   operate the heating and cooling system for a second predetermined period of time if the temperature of the room is approaching the set point.

2. The system of claim 1, wherein the control system is further configured to check the temperature of the room after operating the heating and cooling system for the first predetermined period of time, and to make a determination whether the temperature of the room is approaching a set point.

3. The system of claim 2, wherein the control system is configured to shut down the heating and cooling system after operating the heating and cooling system for the second predetermined period of time and to monitor the temperature of the room until the temperature once again reaches or exceeds the maximum temperature or the room becomes occupied.

4. The system of claim 2, wherein the control system is configured to operate the heating and cooling system for a maximum period of time if the temperature is not approaching the set point.

5. The system of claim 4, wherein the control system is configured to determine whether the temperature is approaching the set point by determining whether the temperature is below or above the maximum or minimum temperature thresholds respectively.

6. The system of claim 4, wherein the control system is configured to receive control signals from a central computer system and to transmit data collected from sensors in the rooms to the central computer system.

7. The system of claim 2, wherein the control system is configured to determine whether the temperature is approaching the set point by determining whether the temperature is below or above the maximum or minimum temperature thresholds respectively.

8. An environment control system for controlling the temperature in a room, the system comprising:
   a temperature sensor for monitoring the temperature within a room;
   at least one occupancy sensor for determining whether the room is occupied;
   a heating and cooling system;
   a control system in communication with the temperature sensor, the at least one occupancy sensor, and the heating and cooling system, the control system being configured to control the room's temperature via the heating and cooling system based at least in part on signals received from the temperature sensors and the at least one occupancy sensor, the control system being configured to operate the heating and cooling system in a power savings mode when the room is unoccupied based on a series of time cycles during which the heating and cooling system is turned on or off as dictated by a plurality of temperature thresholds;
   wherein the environment control system comprises a plurality of control systems, each control system being configured to control the temperature of a room in a multi-room building; and
   wherein the plurality of temperature thresholds comprise a plurality of tables of high and low thresholds pairs, and wherein the control system is configured to use one of the tables initially to control the room temperature and to then use another of the plurality of tables based on how long the room remains unoccupied.

9. An environment control system for controlling the temperature in a room, the system comprising:
   a temperature sensor for monitoring the temperature within a room;
   at least one occupancy sensor for determining whether the room is occupied;
   a heating and cooling system;
   a control system in communication with the temperature sensor, the at least one occupancy sensor, and the heating and cooling system, the control system being configured to control the room's temperature via the heating and cooling system based at least in part on signals received from the temperature sensors and the at least one occupancy sensor, the control system being configured to operate the heating and cooling system in a power savings mode when the room is unoccupied based on a series of time cycles during which the heating and cooling system is turned on or off as dictated by a plurality of temperature thresholds;

wherein the plurality of temperature thresholds comprise a table of high and low threshold pairs, and wherein the control system is configured to use a selected one of the pairs to control the room temperature; and wherein the control system is further configured to operate the heating and cooling system for a minimum off time during which the heating and cooling system is off after a high or low temperature threshold of the plurality of temperature thresholds is satisfied due to operation of the heating and cooling system.

10. An environment control system for controlling the temperature in a room, the system comprising:

a heating and cooling system;

a thermostat for monitoring the temperature within a room and controlling the heating and cooling system;

an activity sensor for detecting whether a door or window to the room has been opened;

a presence detector for detecting whether the room is currently occupied;

a control system in communication with the thermostat, the activity sensor, and the presence detector, the control system being configured to control the room's temperature via the thermostat based at least in part on signals received from the thermostat, the activity sensor, and the presence detector, the control system being configured to cause the heating and cooling system to operate in a power savings mode when the room is unoccupied based on a series of time cycles during which the heating and cooling system is turned on or off as dictated by a plurality of temperature thresholds and a plurality of time thresholds;

wherein the control system is configured to monitor signal data from the presence detector and the activity sensor to determine whether the room is occupied; and where information received from the activity sensor is configured to initiate a time period during which the presence detector is configured to search the enclosure for an occupant, and wherein the control system is configured to take control of the heating and cooling system operation via the thermostat after expiration of the time period when the presence detector does not detect the occupant during the time period.

11. The control system of claim 10, wherein the control system is configured to take control of the heating and cooling system operation by shutting the heating and cooling system off until a maximum or minimum temperature is reached or exceeded.

12. The control system of claim 10, wherein the control system is further configured to maintain control of the operation of the heating and cooling system until the activity sensor senses that the occupant has returned.

13. An environment control system for controlling the temperature in a room, the system comprising:

a heating and cooling system;

a thermostat for monitoring the temperature within a room and controlling the heating and cooling system;

an activity sensor for detecting whether a door or window to the room has been opened;

a presence detector for detecting whether the room is currently occupied;

a control system in communication with the thermostat, the activity sensor, and the presence detector, the control system being configured to control the room's temperature via the thermostat based at least in part on signals received from the thermostat, the activity sensor, and the presence detector, the control system being configured to cause the heating and cooling system to operate in a power savings mode when the room is unoccupied based on a series of time cycles during which the heating and cooling system is turned on or off as dictated by a plurality of temperature thresholds and a plurality of time thresholds;

the control system further comprising a plurality of activity sensors configured to detect when the occupant enter or exits the enclosure through a main entrance as well as when the occupant opens a window, balcony door, or other secondary entrance, and wherein the control system is configured to take control of the operation of the heating and cooling system when one of the plurality of activity sensors detects that a window, balcony door, or secondary entrance has been opened.

14. An environment control system for controlling the temperature in a room, the system comprising:

a heating and cooling system;

a thermostat for monitoring the temperature within a room and controlling the heating and cooling system;

an activity sensor for detecting whether a door or window to the room has been opened;

a presence detector for detecting whether the room is currently occupied;

a control system in communication with the thermostat, the activity sensor, and the presence detector, the control system being configured to control the room's temperature via the thermostat based at least in part on signals received from the thermostat, the activity sensor, and the presence detector, the control system being configured to cause the heating and cooling system to operate in a power savings mode when the room is unoccupied based on a series of time cycles during which the heating and cooling system is turned on or off as dictated by a plurality of temperature thresholds and a plurality of time thresholds;

wherein the control system is configured to shut down a heating and cooling system of the room when the control system detects that the room is currently unoccupied, and to monitor the temperature of the room until the temperature reaches or exceeds a maximum or minimum threshold temperature; and wherein the control system is further configured to:

calculate a first predetermined period of time based on one of the maximum temperature threshold and a set point temperature, operate the heating and cooling system of the room for the first predetermined period of time when the temperature of the room reaches or exceeds the maximum or minimum threshold temperature, and operate the heating and cooling system for a second predetermined period of time if the temperature of the room is approaching the set point.

15. The system of claim 14, wherein the control system is further configured to check the temperature of the room after operating the heating and cooling system for the first predetermined period of time, and to make a determination whether the temperature of the room is approaching a set point.

16. The system of claim 15, wherein the control system is configured to shut down the heating and cooling system after operating the heating and cooling system for the second predetermined period of time and to monitor the temperature of the room until the temperature once again reaches or exceeds the maximum or minimum temperature or the room becomes occupied.

17. The system of claim 15, wherein the control system is configured to determine whether the temperature is approaching the set point by determining whether the temperature is below or above the maximum or minimum temperature thresholds respectively.

\* \* \* \* \*